US011939843B2

(12) United States Patent
Mlcak

(10) Patent No.: US 11,939,843 B2
(45) Date of Patent: Mar. 26, 2024

(54) WELLBORE SCRAPER ASSEMBLY

(71) Applicant: Halliburton Energy Services, Inc., Houston, TX (US)

(72) Inventor: Matthew Craig Mlcak, Parker, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/850,544

(22) Filed: Jun. 27, 2022

(65) Prior Publication Data

US 2022/0325610 A1 Oct. 13, 2022

Related U.S. Application Data

(60) Division of application No. 16/575,529, filed on Sep. 19, 2019, now Pat. No. 11,549,336, which is a continuation of application No. PCT/US2018/065691, filed on Dec. 14, 2018.

(51) Int. Cl.
*E21B 37/02* (2006.01)
*B08B 9/043* (2006.01)

(52) U.S. Cl.
CPC ............ *E21B 37/02* (2013.01); *B08B 9/0436* (2013.01)

(58) Field of Classification Search
CPC ........ E21B 37/02; E21B 37/04; E21B 37/045; E21B 37/00
See application file for complete search history.

(56) References Cited

U.S. PATENT DOCUMENTS

| | | | | | |
|---|---|---|---|---|---|
| 1,401,464 | A * | 12/1921 | Crotto | E21B 37/00 | 166/223 |
| 1,402,786 | A * | 1/1922 | Muehl | E21B 37/02 | 175/269 |
| 2,396,935 | A * | 3/1946 | Walstrom | E21B 47/107 | 73/152.58 |
| 2,728,398 | A * | 12/1955 | Taylor | E21B 37/02 | 166/170 |
| 2,865,455 | A | 12/1958 | Rhoads | | |
| 2,998,074 | A * | 8/1961 | Casady | E21B 37/02 | 166/172 |
| 3,292,705 | A * | 12/1966 | Hall, Sr. | E21B 17/1028 | 166/173 |
| 3,961,824 | A | 6/1976 | Van Eek et al. | | |
| 4,299,282 | A | 11/1981 | Thornton | | |
| 4,603,739 | A | 8/1986 | Krugh | | |
| 8,491,727 | B2 | 7/2013 | Jonassen | | |
| 8,499,399 | B1 * | 8/2013 | Jones | B08B 9/0436 | 15/104.19 |
| 9,879,505 | B2 | 1/2018 | Holloway et al. | | |

(Continued)

*Primary Examiner* — Kipp C Wallace
(74) *Attorney, Agent, or Firm* — John Wustenberg; Parker Justiss, P.C.

(57) ABSTRACT

Provided is a wellbore scraper assembly for use with a wireline. The wellbore scraper assembly, in one example, includes a tubular housing, a plurality of hydraulically deployable scraper features associated with the tubular housing, the plurality of hydraulically deployable scraper features configured to move from a first retracted state to a second radially extended state, and a hydraulic deployment system coupled to the plurality of hydraulically deployable scraper features, the hydraulic deployment system configured to move the plurality of hydraulically deployable scraper features from the first state to the second state.

17 Claims, 6 Drawing Sheets

(56) References Cited

U.S. PATENT DOCUMENTS

| | | | | |
|---|---|---|---|---|
| 10,119,368 | B2 | 11/2018 | Tunget | |
| 2014/0110179 | A1 * | 4/2014 | Lassoie | E21B 44/00 175/285 |
| 2015/0075799 | A1 | 3/2015 | Wilson et al. | |
| 2016/0010413 | A1 | 1/2016 | Stokes et al. | |
| 2016/0138369 | A1 * | 5/2016 | Tunget | E21B 37/02 166/174 |
| 2016/0168643 | A1 | 6/2016 | Ahlquist et al. | |
| 2016/0230508 | A1 * | 8/2016 | Jensen | E21B 4/04 |
| 2016/0312582 | A1 | 10/2016 | Ali et al. | |
| 2017/0362917 | A1 | 12/2017 | Esslemont et al. | |
| 2018/0119507 | A1 * | 5/2018 | Nordenstam | E21B 47/12 |
| 2019/0284905 | A1 | 9/2019 | Sehsah et al. | |

* cited by examiner

WELLBORE SCRAPER ASSEMBLY

CROSS-REFERENCE TO RELATED APPLICATION

This application is a divisional of U.S. application Ser. No. 16/575,529, filed on Sep. 19, 2019, entitled "WELLBORE SCRAPER ASSEMBLY" which claims priority to International Application Number PCT/US2018/065691 filed on Dec. 14, 2018, entitled "WELLBORE SCRAPER ASSEMBLY," which applications are commonly assigned with this application and incorporated herein by reference in their entirety.

BACKGROUND

It is well known in the oil and gas drilling industry to run a scraper assembly down a wellbore so as to clean the inner surface of the wellbore casing wall. This operation is typically undertaken when there is a need to grip the inner surface of the wellbore casing with a wellbore tool, such as a plug, inflatable packer, or the like. Naturally, the effectiveness of the wellbore tool gripping the casing is improved if the portion of wellbore casing being gripped is substantially clean and free of loose fragments.

Current technologies that are used to clean the inner surface of the wellbore casing wall include rigid tubing based scraper assemblies and wireline based scraper assemblies. Rigid tubing based scraper assemblies require a rigid work string, as well as an oil derrick for deploying the same. Accordingly, such rigid tubing based scraper assemblies are time consuming and expensive.

Wireline based scraper assemblies, on the other hand, do not require an oil derrick, and thus are less time consuming and expensive. Unfortunately, the wireline based scraper assemblies are found on the very bottom of the wireline, which means that no other wellbore tools can be placed there below. Accordingly, multiple trips are needed to first scrape and clean a target location, and then subsequently set the wellbore tool. Additionally, it is not guaranteed that the operator will be able to find the cleaned location of the wellbore casing, and thus be able to set the wellbore tool in the correct location. Moreover, it is quite possible that new debris may be introduced between the multiple trips. Given the foregoing, what is needed in the art is a wireline based wellbore scraper assembly that does not experience the drawbacks of exiting systems.

BRIEF DESCRIPTION

Reference is now made to the following descriptions taken in conjunction with the accompanying drawings, in which.

DETAILED DESCRIPTION

Figure 1:
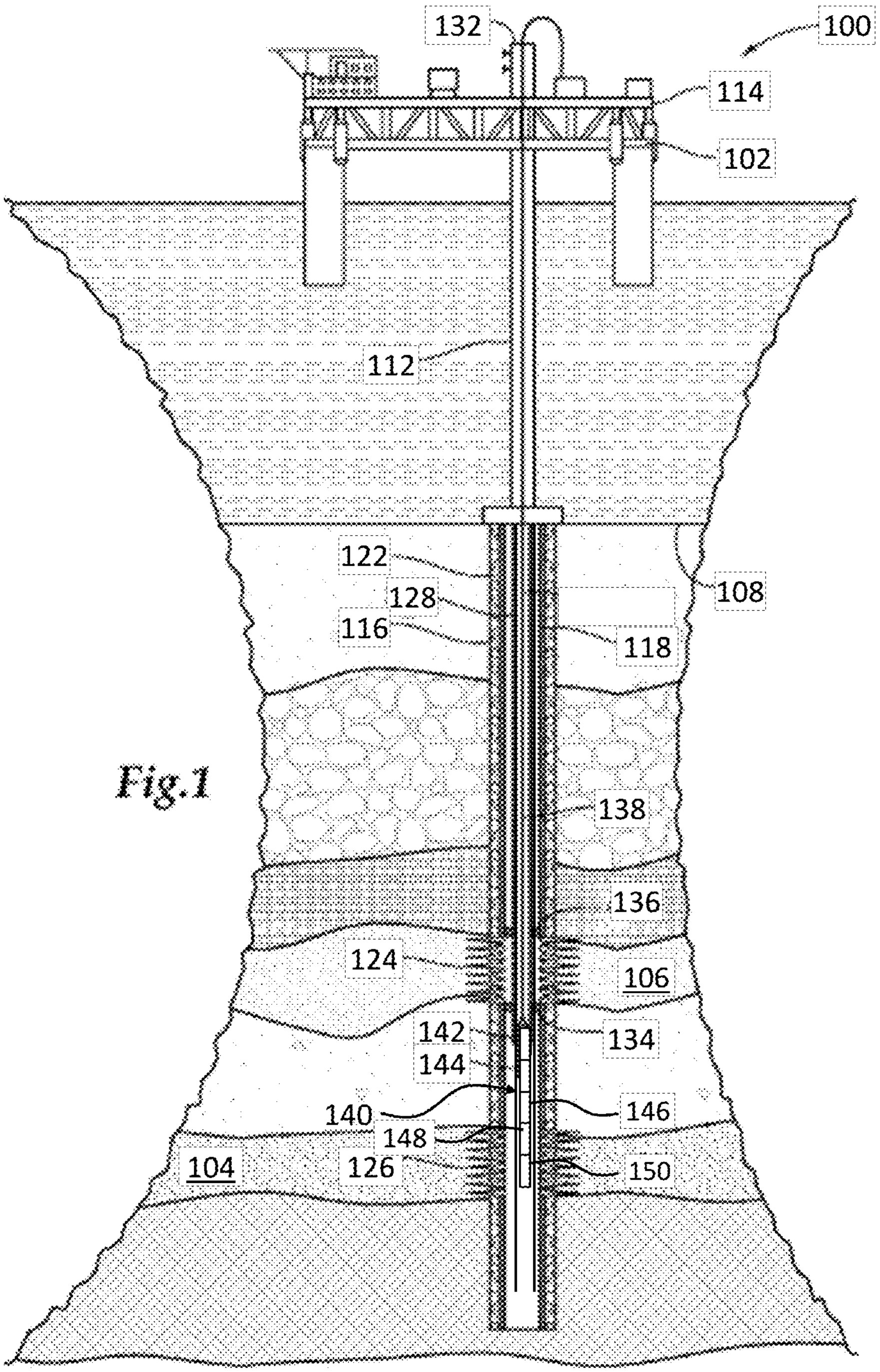
FIG. 1 illustrates a schematic of an oil/gas well system according to the disclosure.

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form, and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally toward the surface of the formation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

Referring initially to FIG. 1, illustrated is a schematic of an oil/gas well system 100 according to the disclosure. The oil/gas well system 100 may employ a wireline based scraper system 140 as taught herein. The oil/gas well system 100, in the embodiment shown, includes a semi-submersible platform 102 centered over submerged oil and gas formations 104, 106 located below sea floor 108. A subsea conductor 112 extends from deck 114 of platform 102 to sea floor 108. A wellbore 116 extends from sea floor 108 and traverses formations 104, 106. Wellbore 116, in the embodiment shown, includes a casing 118 that is supported therein by cement 122. Casing 118 has two sets of perforations 124, 126 in the intervals proximate formations 104, 106.

A tubing string 128 extends from wellhead 132 to a location below formation 104 and provides a conduit for production fluids to travel to the surface. A pair of packers 134, 136 provides a fluid seal between tubing string 128 and casing 118 and directs the flow of production fluids from formations 104, 106 to the interior of tubing string 128 through, for example, a slotted liner. Disposed within tubing string 128 is a wireline 138 used to convey a wireline based scraper system 140 designed and manufactured according to one embodiment of the disclosure. The term wireline, as used herein, is intended to exclude rigid conveyance mechanisms, such as one or more sections of rigid pipe, and is intended to include all known or future developed non-rigid conveyance mechanisms. For example, the term wireline includes, without limitation, traditional wireline, slickline, braided cable, electric line and other related non-rigid conveyances. Accordingly, the present disclosure should not be limited to any specific type of non-rigid conveyance, but should exclude all types of rigid conveyances.

The wireline based scraper system 140, in the embodiment shown, includes a jar mechanism 142, a hydraulic power pack 144, a wellbore scraper assembly 146 according to the disclosure, a catch basket 148 according to the disclosure, and a wellbore tool 150. In accordance with the disclosure, the wellbore scraper assembly 146 includes a plurality of hydraulically deployable scraper features (not shown) that move from a first retracted state to a second radially extended state, for example using fluid provided from the hydraulic power pack 144 suspended from the wireline 138 and a hydraulic deployment system associated therewith. The catch basket 148, in one embodiment, additionally includes hydraulically deployable collection arms (not shown) coupled proximate a downhole end of the wellbore scraper assembly.

A wireline based scraper system according to the present disclosure, in contrast to existing wireline based systems, can clean the wellbore casing and set a wellbore tool in the same run, which is a major time savings for the customer. Additionally, with relay tool strings, an operator of the device can get real time feedback of the downhole tension to know whether or not the scrapper is actually cleaning debris or is freely moving in the hole. Moreover, since the wireline based scraper system uses arms in certain embodiments, the run in hole diameter of the wireline based scraper system can be lowered so that the run in hole diameter is minimized. This is useful in setting higher expansion plugs.

Even though FIG. 1 depicts a vertical well, it should be understood by those skilled in the art that the wireline based scraper system 140 of the present disclosure is equally well-suited for use in deviated wells, inclined wells, horizontal wells, multilateral wells and the like. Likewise, even though FIG. 1 depicts an offshore operation, it should be understood by those skilled in the art that aspects of the present disclosure are equally well-suited for use in onshore operations.

Figure 2:
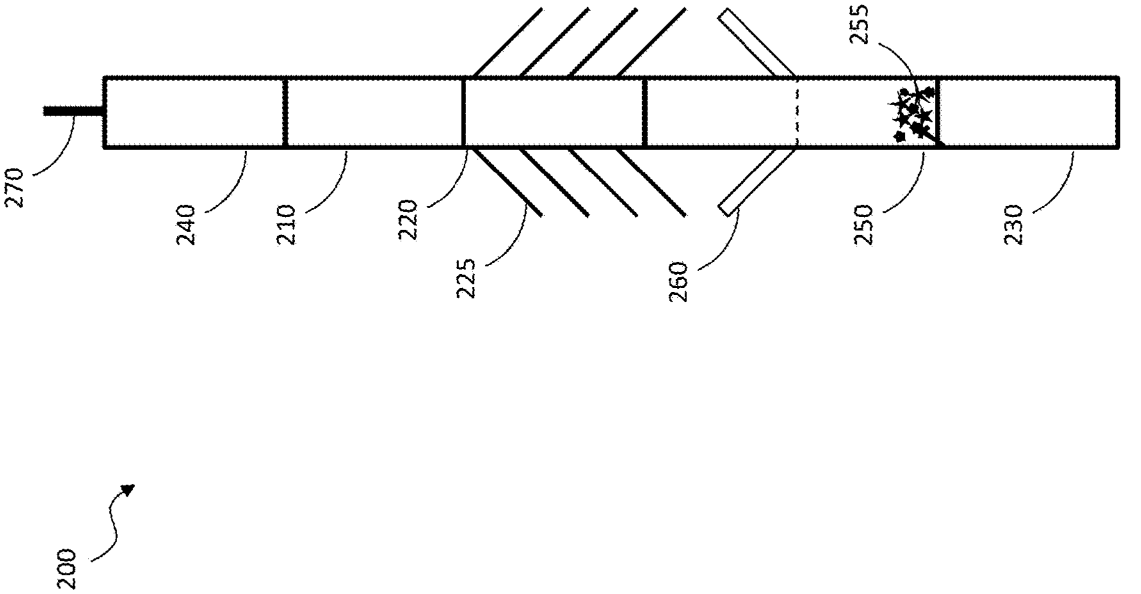
FIG. 2 illustrates one embodiment of a wireline based scraper system manufactured according to one embodiment of the disclosure.

Referring now to FIG. 2, there is shown one embodiment of a wireline based scraper system 200 manufactured according to one embodiment of the disclosure. The wireline based scraper system 200, in the illustrated embodiment, includes a hydraulic power pack 210. The hydraulic power pack 210 is illustrated as being located near an uphole end of the wireline based scraper system 200. Notwithstanding, the hydraulic power pack 210 may be positioned at various different locations within the wireline based scraper system 200 and remain with the scope of the disclosure. In accordance with the embodiment shown in FIG. 2, the hydraulic power pack 210 provides power, whether it is fluid or electrical based power, or both, to other features within the wireline based scraper system 200. Accordingly, the hydraulic power pack 210 allows the wireline based scraper system 200 to be a self-contained unit that may operate without power and/or instruction from the surface.

The wireline based scraper system 200 illustrated in FIG. 2 additionally includes a wellbore scraper assembly 220 manufactured and designed according to the disclosure. In the illustrated embodiment, the wellbore scraper assembly 220 is located downhole of the hydraulic power pack 210. Other embodiments may exist wherein the wellbore scraper assembly 220 is positioned uphole of the hydraulic power pack 210. The wellbore scraper assembly 220, in accordance with the disclosure, includes a plurality of hydraulically deployable scraper features 225. The plurality of hydraulically deployable scraper features 225, in one embodiment, are configured to move from a first retracted state (not shown) to the second radially expanded state illustrated in FIG. 2. Accordingly, the plurality of hydraulically deployable scraper features 225 may be used to clean debris from inside a wellbore casing. The hydraulically deployable scraper features 225 are illustrated as arms in FIG. 2, but other embodiments exist wherein the hydraulically deployable scraper features 225 are configured as brushes, for example that could be rotated using the hydraulic power pack 210 if necessary.

In accordance with the disclosure, a wellbore tool 230 may be positioned proximate a lower end of the wireline based scraper system 200. The wellbore tool 230 may comprise a variety of different tools and remain within the scope of the disclosure. In fact, any tool capable of being controlled and/or deployed using the hydraulic power pack 210 is within the scope of the disclosure. For example, without limitation, the wellbore tool 230 could be a plug, an inflatable packer, or another similar device and remain within the scope of the disclosure. In this configuration, the wireline based scraper system 200 may be used to clean a wellbore casing and set a wellbore tool 230 within the wellbore casing in a single trip. Moreover, after setting the wellbore tool 230, the wireline based scraper system 200 (e.g., including the wellbore scraper assembly 220) could detach from the wellbore tool 230, such that the wellbore tool 230 may be left to remain in the wellbore casing.

In certain embodiments, the wireline based scraper system 200 may additionally optionally include a jar mechanism 240. The jar mechanism 240 may be used to assist the wireline based scraper system 200 to traverse down a wellbore casing when gravity is insufficient to do the same. Those skilled in the art understand the myriad different types of jar mechanisms 240 that might be used to assist in the deployment of the wireline based scraper system 200. Accordingly, the present disclosure should not be limited to any specific type of jar mechanism 240. In the illustrated embodiment, the jar mechanism 240 is positioned proximate an upper end of the wireline based scraper system 200. Other locations, however, might also be used.

The wireline based scraper system 200 may additionally optionally include an integrated catch basket 250. The catch basket 250, in accordance with the embodiment of FIG. 2, is configured to collect any debris 255 that may be dislodged from the inside of the wellbore casing when using the wellbore scraper assembly 220. Accordingly, the catch basket 250 would ideally be located below the wellbore scraper assembly 220. The catch basket 250 may comprise a variety of different catch basket designs and remain within the scope of the disclosure. In the illustrated embodiment of FIG. 2, however, the catch basket 250 includes one or more hydraulically deployable collection arms 260. The hydraulically deployable collection arms 260, in accordance with this embodiment, may move from a first running state (not shown) to a second collection state using power from the hydraulic power pack 210. Accordingly, the hydraulically deployable collection arms 260 could run downhole in the first running state, and then just before using the wellbore scraper assembly 220 to clean the wellbore casing, radially extend to the second collection state. Additionally, when the wellbore casing has been sufficiently cleaned, the hydraulically deployable collection arms 260 could return to the first running state, and thus contain the debris 255. In accordance with the disclosure, the wireline based scraper system 200 is configured to be deployed downhole within the wellbore casing using a wireline 270.

Figure 3:
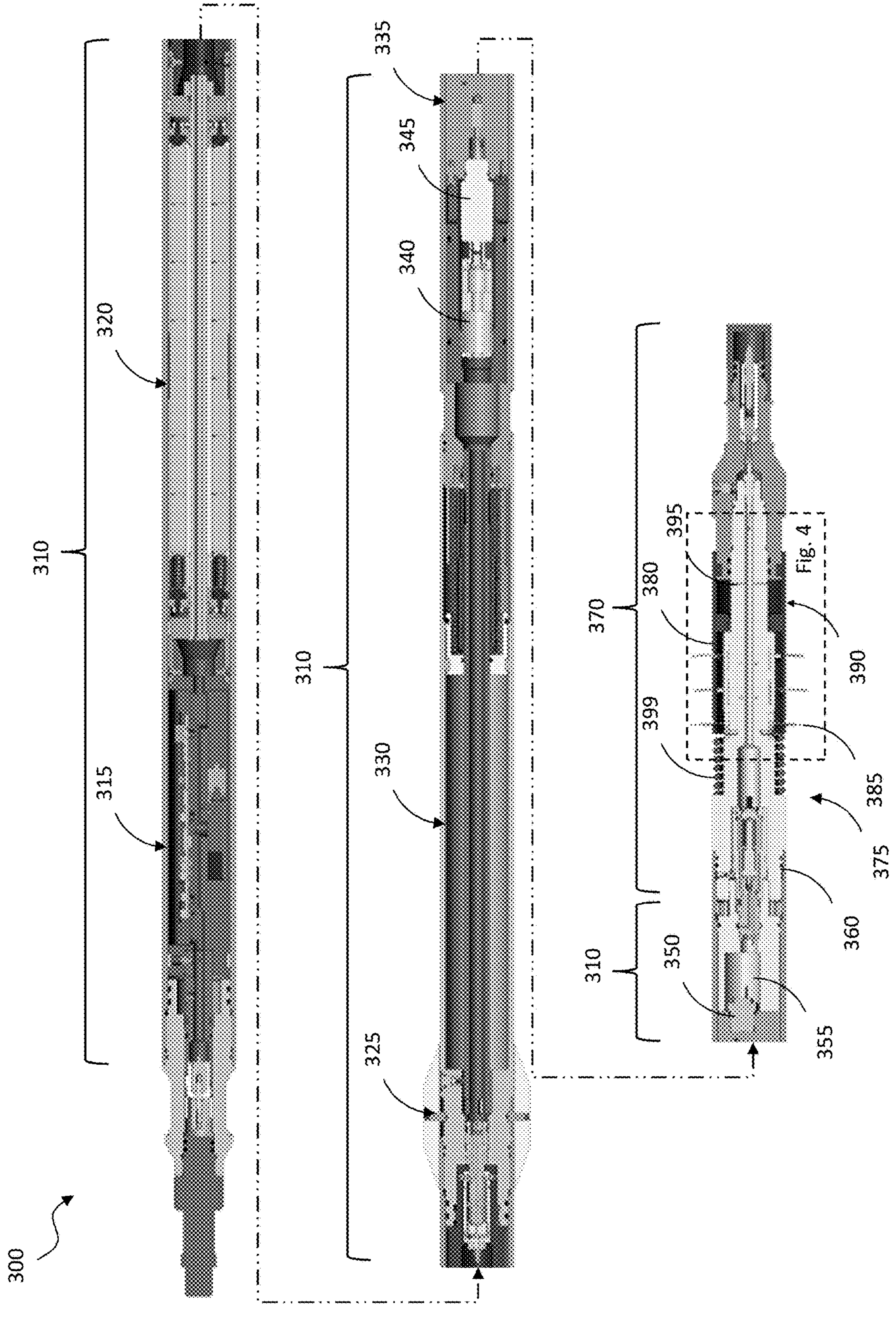
FIG. 3 illustrates an alternative embodiment of a wireline based scraper system according to the disclosure.

Turning to FIG. 3, illustrated is an alternative embodiment of a wireline based scraper system 300 according to the disclosure. The wireline based scraper system 300 shown in FIG. 3 includes a hydraulic power pack section 310, as well as a wellbore scraper assembly section 370. The hydraulic power pack section 310, in the illustrated embodiment, includes an electronics section 315, as well as a power (e.g., battery power) section 320. In the illustrated embodiment, a connector 325, couples the power section 320 to a pressure compensation reservoir section 330. The pressure compensation reservoir section 330, in the illustrated embodiment, is configured to balance pressures inside and outside of the tool.

In the illustrated embodiment, a hydraulic drive system 335 is coupled downhole of the pressure compensation reservoir section 330. The hydraulic drive system 335, in this embodiment, includes an electric motor 340 and a hydraulic fluid pump 345. The hydraulic drive system 335, in this embodiment, additionally includes a solenoid 350, which feeds into a manifold 355. In the embodiment shown, a filed joint 360 couples the hydraulic power pack section 310 to the well scraper assembly section 370.

The well scraper assembly section 370, in accordance with the disclosure, incudes a well scraper assembly 375. The well scraper assembly 375, in accordance with the disclosure, includes a tubular housing 380, as well as a plurality of hydraulically deployable scraper features 385 associated with the tubular housing. In the illustrated embodiment, the plurality of hydraulically deployable scraper features 385 are configured to move from a first retracted state (not shown) to the second radially extended state illustrated in FIG. 3. The well scraper assembly 375, in this embodiment, additionally includes a hydraulic deployment system 390 coupled to the plurality of hydraulically deployable scraper features 385. The hydraulic deployment system 390, in the illustrated embodiment, is hydraulically coupled to the hydraulic power pack section 310. In the illustrated embodiment, fill ports 395 fluidly coupled to the hydraulic power pack section 310 are used to provide fluid to the the hydraulic deployment system 390.

In operation, the wireline based scraper system 300 could be lowered downhole into a wellbore casing using a wireline. When running downhole, the hydraulically deployable scraper features 385 would generally be in the first retracted state. At the point the wireline based scraper system 300 reaches a region of the wellbore casing to be cleaned, the hydraulically deployable scraper features 385 could be extended to the second radially extended state shown in FIG. 3. For example, the electronics section 315 could signal the electric motor 340 to begin operation (e.g., using the power section 320), which in turn would start the hydraulic fluid pump 345. Accordingly, the hydraulic fluid pump 345 would provide fluid through the solenoid 350, manifold 355 and fill port 395 to the hydraulic deployment system 390. Accordingly, in the embodiment shown a volume of the hydraulic deployment system 390 would increase, and thus extend the hydraulically deployable scraper features 385 from the first retracted state to the second radially extended state. In certain embodiments, the solenoid 350 is powered, and thus in a closed position, when the hydraulic fluid pump 345 is operational.

With the hydraulically deployable scraper features 385 in the second radially extended state, the wireline based scraper system 300 could be moved uphole and downhole within the region to form a cleaned area of the wellbore casing. In one example, the solenoid 350 remains powered, and thus in a closed position, while cleaning the wellbore casing. Thus, even though power has been cut to the electric motor 340, the hydraulically deployable scraper features 385 are maintained in the second radially extended state. When the cleaning is complete, power may be cut to the solenoid 350, which would allow a return mechanism (e.g., a spring 399 in the embodiment of FIG. 3) to decrease the volume of the hydraulic deployment system 390, thus pressing any fluid in the hydraulic deployment system 390 back out the fill port 395, through the manifold 355 and solenoid 350, and ultimately returning the hydraulically deployable scraper features 385 to the first retracted state. With the hydraulically deployable scraper features 385 retracted, a wellbore tool could be set in the cleaned area of the wellbore casing, and thereafter the wireline based scraper system 300 could detach from the wellbore tool and be retrieved uphole and out of the wellbore. While a single example has been disclosed for using a wireline based scraper system, such as the wireline based scraper system 300, to clean a wellbore casing, the present disclosure should not be limited to any specific method.

Figure 4:
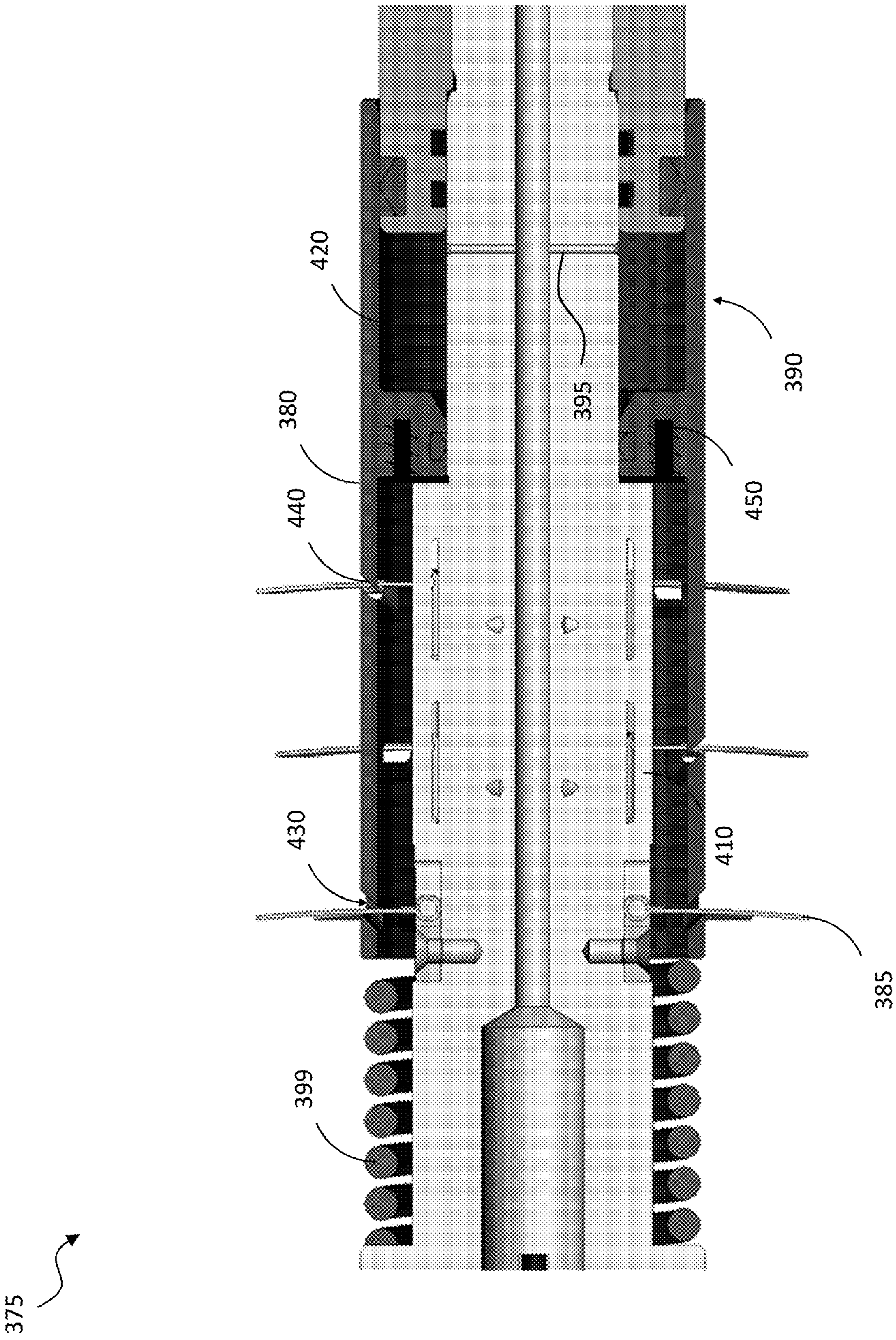
FIG. 4 illustrates a zoomed in view of certain aspects of the wellbore scraper assembly of FIG. 3.

Turning to FIG. 4, illustrated is a zoomed in view of certain aspects of the wellbore scraper assembly 375 of FIG. 3. In addition to that discussed with regard to FIG. 3, the wellbore scraper assembly 375 includes a deployment rod 410 located within the tubular housing 380. According to this embodiment, the deployment rod 410 is configured to slide relative to the hydraulic deployment system 390 as the volume of a fluid chamber 420 changes. In operation, the deployment rod 410 may remain stationary as the hydraulic deployment system 390 slides relative thereto. The hydraulically deployable scraper features 385, in the illustrated embodiment, are individual thin wall arms that are coupled to the deployment rod 410. Thus, as the volume of the fluid chamber 420 changes, and the deployment rod 410 slides within the tubular housing 380, the hydraulically deployable scraper features 385 move between the first retracted state (not shown) and the second radially extended state. In the embodiment illustrated in FIG. 4, as the volume of the fluid chamber 420 increases, the hydraulically deployable scraper features 385 move toward the second radially extended state, and as the volume of the fluid chamber 420 decreases, the hydraulically deployable scraper features 385 move toward the first retracted state. Further to the embodiment of FIG. 4, each of the individual thin wall arms extend through associated individual guide slots 430 within the tubular housing 380. Further to this embodiment, the individual guide slots 430 sloped sidewalls 440 to help move the plurality of individual thin wall arms between the first and second states.

In accordance with one embodiment, the wellbore scraper assembly 375 may include one or more adjustable limit mechanisms 450. The adjustable limit mechanisms 450, in accordance with this embodiment, are configured to adjust how radially extended the hydraulically deployable scraper features 385 are when in the second radially extended state. For example, in the embodiment illustrated in FIG. 4, as the adjustable limit mechanisms 440 moves left the hydraulically deployable scraper arm 385*s* are less and less radially extended. While a simple threaded rod has been used as the adjustable limit mechanisms 450 in FIG. 4, those skilled in the art understand and appreciate that many different adjustable limit mechanisms 450 are within the scope of the present disclosure.

Figure 5:
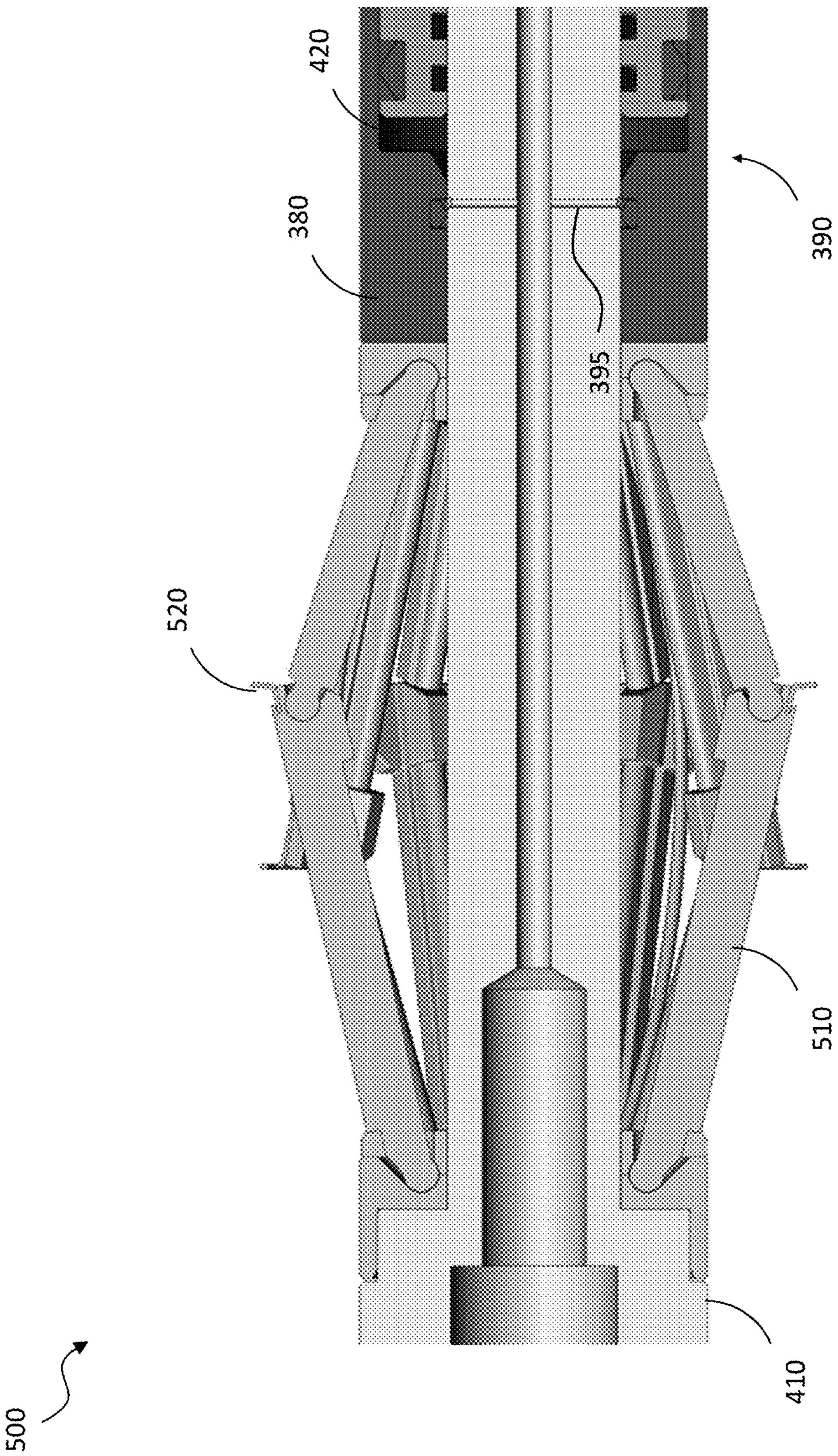
FIG. 5 illustrates a zoomed in view of certain aspects of an alternative embodiment of a wellbore scraper assembly.

Turning to FIG. 5, illustrated is a zoomed in view of certain aspects of an alternative embodiment of a wellbore scraper assembly 500. The wellbore scraper assembly 500 illustrated in FIG. 5 embodies many of the same features as the wellbore scraper assembly 375 of FIGS. 3 and 4. Accordingly, like reference numbers have been used to indicate like (e.g., identical or otherwise) features. The wellbore scraper assembly 500, in contrast to the wellbore scraper assembly 375, employs a plurality of linkage arms 510 for the plurality of hydraulically deployable scraper features. The linkage arms 510 of FIG. 5 are each two bar linkage arms having scraper petals 520 attached thereto. The scraper petals 520, in the illustrated embodiment, are located proximate a centerpoint of the linkage arms 510, and are the features that are configured to engage the wellbore casing needing cleaning. In the embodiment illustrated in FIG. 5, as the volume of the fluid chamber 420 increases, the linkage arms 510 move toward the second radially extended state (not shown), and as the volume of the fluid chamber 420 decreases, the linkage arms 510 move toward the first retracted state illustrated in FIG. 5. Those skilled in the art understand the various types of linkage arms 510 that might be used and remain within the scope of the disclosure.

Figure 6:
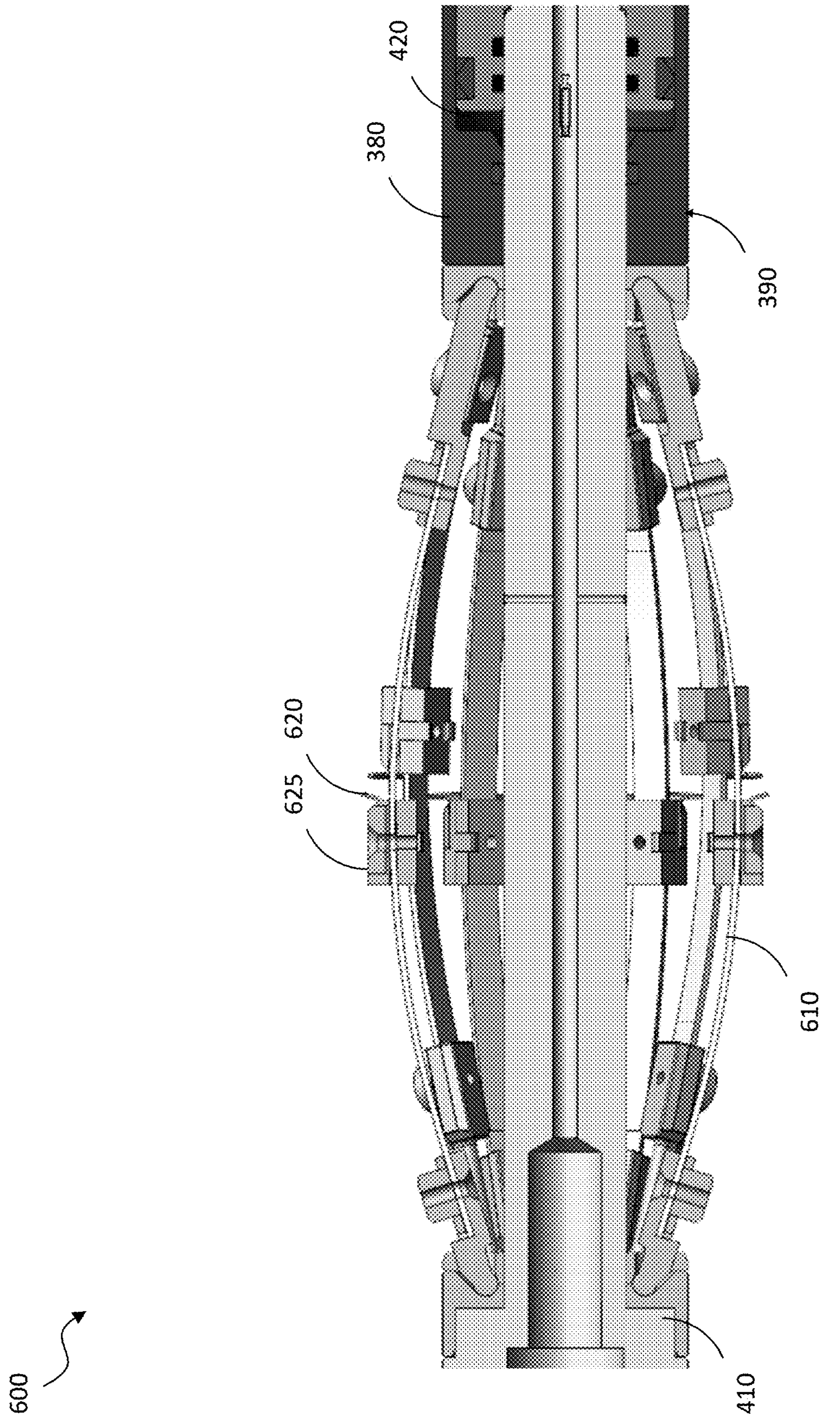
FIG. 6 illustrates a zoomed in view of certain aspects of yet an alternative embodiment of a wellbore scraper assembly.

Turning to FIG. 6, illustrated is a zoomed in view of certain aspects of yet an alternative embodiment of a wellbore scraper assembly 600. The wellbore scraper assembly 600 illustrated in FIG. 6 embodies many of the same features as the wellbore scraper assemblies 375, 500 of FIGS. 3, 4 and 5. Accordingly, like reference numbers have been used to indicate like (e.g., identical or otherwise) features. The wellbore scraper assembly 600, in contrast to the wellbore scraper assembly 375 and wellbore scraper assembly 500, employs a plurality of bow springs 610 for the plurality of hydraulically deployable scraper features. In the embodiment illustrated in FIG. 6, as the volume of the fluid chamber 420 increases, the bow springs 610 move toward the second radially extended state (not shown), and as the volume of the fluid chamber 420 decreases, the bow springs 610 move toward the first retracted state illustrated in FIG. 6. As is illustrated, the bow springs 610 have an arced shape when in the first retracted state, and would further have a second tighter arc when in the second radially extended state. As illustrated in FIG. 6, scraper petals 620 may be attached to the bow springs 610. The scraper petals 620, in the illustrated embodiment, are located proximate a centerpoint of the bow springs 610, and are the features that are configured to engage the wellbore casing needing cleaning. The scraper petals 620 may form part of an interchangeable attachment 625 added to the plurality of bow springs 610 for scraping different wellbore contaminants.

Aspects disclosed herein include:

A. A wellbore scraper assembly for use with a wireline. The wellbore scraper includes: a tubular housing; a plurality of hydraulically deployable scraper features associated with the tubular housing, the plurality of hydraulically deployable scraper features configured to move from a first retracted state to a second radially extended state; and a hydraulic deployment system coupled to the plurality of hydraulically deployable scraper features, the hydraulic deployment system configured to move the plurality of hydraulically deployable scraper features from the first state to the second state.

B. A wireline based scraper system for use within a wellbore. The wireline based scraper system includes: a hydraulic power pack; a wellbore scraper assembly hydraulically coupled to the hydraulic power pack, the wellbore scraper assembly comprising 1) a tubular housing, 2) a plurality of hydraulically deployable scraper features associated with the tubular housing, the plurality of hydraulically deployable scraper features configured to move from a first retracted state to a second radially extended state, and 3) a hydraulic deployment system in fluid communication with the hydraulic power pack and coupled to the plurality of hydraulically deployable scraper features, the hydraulic deployment system configured to move the plurality of hydraulically deployable scraper features from the first state to the second state; and a wellbore tool coupled proximate a downhole end of the wellbore scraper assembly and hydraulically coupled to the hydraulic power pack.

C. A method for cleaning a wellbore casing. The method includes: lowering a wireline based scraper system into a wellbore casing using a wireline, the wireline based scraper system including 1) a hydraulic power pack, 2) a wellbore scraper assembly hydraulically coupled to the hydraulic power pack, the wellbore scraper assembly including a) a tubular housing, b) a plurality of hydraulically deployable scraper features associated with the tubular housing, the plurality of hydraulically deployable scraper features in a first retracted state, and c) a hydraulic deployment system in fluid communication with the hydraulic power pack and coupled to the plurality of hydraulically deployable scraper features, the hydraulic deployment system configured to move the plurality of hydraulically deployable scraper features from the first state to a second radially extended state, 3) a wellbore tool coupled proximate a downhole end of the wellbore scraper assembly and hydraulically coupled to the hydraulic power pack; extending the hydraulically deployable scraper features from the first retracted state to the second radially extended state when the wireline based scraper system reaches a region of the wellbore casing to be cleaned; moving the wireline based scraper system with the hydraulically deployable scraper features in the second radially extended state uphole and downhole in the region to form a cleaned area of the wellbore casing; returning the hydraulically deployable scraper features to the first retracted state after forming the cleaned area; and setting a wellbore tool in the cleaned area after returning the hydraulically deployable scraper features to the first retracted state.

Aspects A, B, and C may have one or more of the following additional elements in combination:

Element 1: further including a deployment rod located within the tubular housing, and further wherein the hydraulic deployment system includes a fluid chamber, the deployment rod configured to slide relative to the tubular housing as a volume of the fluid chamber changes. Element 2: wherein plurality of hydraulically deployable scraper features are coupled to the deployment rod, and further wherein the plurality of hydraulically deployable scraper features move from the first state to the second state as the volume of the fluid chamber changes. Element 3: wherein the plurality of hydraulically deployable scraper features are a plurality of individual thin wall arms. Element 4: wherein the plurality of individual thin wall arms are coupled to a slidable deployment rod located within the tubular housing, and further wherein the plurality of individual thin wall arms are configured to move from the first state to the second state as the slidable deployment rod slides within the tubular housing. Element 5: wherein each of the individual thin wall arms extend through associated individual guide slots within the tubular housing, and further wherein the individual guide slots are sloped to help move the plurality of individual thin wall arms between the first and second states. Element 6: wherein the plurality of hydraulically deployable scraper features are a plurality of linkage arms. Element 7: wherein each of the plurality of linkage arms includes a scraper petal located proximate a center point thereof. Element 8: wherein the plurality of hydraulically deployable scraper features are a plurality of bow springs. Element 9: wherein each of the plurality of bow springs has a first arc in the first state and a second tighter arc in the second state. Element 10: further including interchangeable attachments added to the plurality of bow springs for scraping different wellbore contaminants. Element 11: further including a spring mechanism associated with the plurality of hydraulically deployable scraper features, the spring mechanism configured to return the plurality of hydraulically deployable scraper features to the first state from the second state. Element 12: further including an adjustable limit mechanism, the adjustable limit mechanism configured to adjust the second state. Element 13: further including a jar mechanism coupled proximate a top end thereof. Element 14: further including a catch basket including hydraulically deployable collection arms coupled proximate a downhole end of the wellbore scraper tool.

Those skilled in the art to which this application relates will appreciate that other and further additions, deletions, substitutions and modifications may be made to the described embodiments.

What is claimed is:

1. A wellbore scraper assembly for use with a wireline, comprising: a tubular housing; a plurality of hydraulically deployable scraper features associated with the tubular housing, each of the plurality of hydraulically deployable scraper features having an axial centerpoint and one or more interchangeable attachments added thereto for scraping different wellbore contaminants, each of the one or more interchangeable attachments having a scraper petal mounted thereto and extending radially outward from the hydraulically deployable scraper feature near the axial centerpoint, wherein the scraper petals extend above an upper end or below a lower end of the interchangeable attachments they are mounted to, the plurality of hydraulically deployable scraper features configured to move from a first retracted state having the scraper petals radially retracted to a second radially extended state having the scraper petals radially extended, the plurality of hydraulically deployable scraper features comprising a plurality of linkage arms or a plurality of bow springs; and a hydraulic deployment system coupled to the plurality of hydraulically deployable scraper features, the hydraulic deployment system configured to move the plurality of hydraulically deployable scraper features from the first state to the second state.

2. The wellbore scraper assembly as recited in claim 1, wherein the plurality of hydraulically deployable scraper features are a plurality of linkage arms.

3. The wellbore scraper assembly as recited in claim 1, wherein the plurality of hydraulically deployable scraper features are a plurality of bow springs.

4. The wellbore scraper assembly as recited in claim 3, wherein each of the plurality of bow springs has a first arc in the first state and a second tighter arc in the second state.

5. The wellbore scraper assembly as recited in claim 1, further including a spring mechanism associated with the plurality of hydraulically deployable scraper features, the spring mechanism configured to return the plurality of hydraulically deployable scraper features to the first state from the second state.

6. The wellbore scraper assembly as recited in claim 1, further including an adjustable limit mechanism, the adjustable limit mechanism configured to adjust the second state.

7. A wireline based scraper system for use within a wellbore, comprising: a hydraulic power pack; a wellbore scraper assembly hydraulically coupled to the hydraulic power pack, the wellbore scraper assembly comprising: a tubular housing; a plurality of hydraulically deployable scraper features associated with the tubular housing, each of the plurality of hydraulically deployable scraper features having an axial centerpoint and one or more interchangeable attachments added thereto for scraping different wellbore contaminants, each of the one or more interchangeable attachments having a scraper petal mounted thereto extending radially outward from the hydraulically deployable scraper feature near the axial centerpoint, wherein the scraper petals extend above an upper end or below a lower end of the interchangeable attachments they are mounted to, the plurality of hydraulically deployable scraper features configured to move from a first retracted state having the scraper petals radially retracted to a second radially extended state having the scraper petals radially retracted, the plurality of hydraulically deployable scraper features comprising a plurality of linkage arms or a plurality of bow springs; and a hydraulic deployment system in fluid communication with the hydraulic power pack and coupled to the plurality of hydraulically deployable scraper features, the hydraulic deployment system configured to move the plurality of hydraulically deployable scraper features from the first state to the second state; and a wellbore tool coupled proximate a downhole end of the wellbore scraper assembly and hydraulically coupled to the hydraulic power pack.

8. The wireline based scraper system as recited in claim 7, wherein the plurality of hydraulically deployable scraper features are a plurality of linkage arms.

9. The wireline based scraper system as recited in claim 7, wherein the plurality of hydraulically deployable scraper features are a plurality of bow springs.

10. The wireline based scraper system as recited in claim 9, wherein each of the plurality of bow springs has a first arc in the first state and a second tighter arc in the second state.

11. The wireline based scraper system as recited in claim 7, further including a spring mechanism associated with the plurality of hydraulically deployable scraper features, the spring mechanism configured to return the plurality of hydraulically deployable scraper features to the first state from the second state.

12. The wireline based scraper system as recited in claim 7, further including and adjustable limit mechanism, the adjustable limit mechanism configured to adjust the second state.

13. A method for cleaning a wellbore casing, comprising:
- lowering a wireline based scraper system into a wellbore casing using a wireline, the wireline based scraper system including:
  - a hydraulic power pack;
  - a wellbore scraper assembly hydraulically coupled to the hydraulic power pack, the wellbore scraper assembly comprising:
    - a tubular housing;
    - a plurality of hydraulically deployable scraper features associated with the tubular housing, the plurality of hydraulically deployable scraper features in a first retracted state, the plurality of hydraulically deployable scraper features comprising a plurality of linkage arms or a plurality of bow springs; and
    - a hydraulic deployment system in fluid communication with the hydraulic power pack and coupled to the plurality of hydraulically deployable scraper features, the hydraulic deployment system configured to move the plurality of hydraulically deployable scraper features from the first state to a second radially extended state; and a wellbore tool coupled proximate a downhole end of the wellbore scraper assembly and hydraulically coupled to the hydraulic power pack;

extending the hydraulically deployable scraper features from the first retracted state to the second radially extended state when the wireline based scraper system reaches a region of the wellbore casing to be cleaned;

moving the wireline based scraper system with the hydraulically deployable scraper features in the second radially extended state uphole and downhole in the region to form a cleaned area of the wellbore casing;

returning the hydraulically deployable scraper features to the first retracted state after forming the cleaned area; and setting a second wellbore tool in the cleaned area after returning the hydraulically deployable scraper features to the first retracted state.

14. The method as recited in claim 13, wherein the plurality of hydraulically deployable scraper features are a plurality of linkage arms.

15. The method as recited in claim 14, wherein each of the plurality of linkage arms includes a scraper petal located proximate a center point thereof.

16. The method as recited in claim 13, wherein the plurality of hydraulically deployable scraper features are a plurality of bow springs.

17. The method as recited in claim 16, wherein each of the plurality of bow springs has a first arc in the first state and a second tighter arc in the second state.

* * * * *